US007303117B2

(12) United States Patent
Ito

(10) Patent No.: US 7,303,117 B2
(45) Date of Patent: Dec. 4, 2007

(54) BANKNOTE-PROCESSING DEVICE

(75) Inventor: Yukio Ito, Saitama (JP)

(73) Assignee: Kabushiki Kaisha Nippon Conlux, Saitama (JP)

(*) Notice: Subject to any disclaimer, the term of this patent is extended or adjusted under 35 U.S.C. 154(b) by 0 days.

(21) Appl. No.: 10/564,227

(22) PCT Filed: Jul. 29, 2004

(86) PCT No.: PCT/JP2004/010809

§ 371 (c)(1),
(2), (4) Date: Jan. 10, 2006

(87) PCT Pub. No.: WO2005/013208

PCT Pub. Date: Feb. 10, 2005

(65) Prior Publication Data

US 2006/0186190 A1 Aug. 24, 2006

(30) Foreign Application Priority Data

Jul. 31, 2003 (JP) ............................ 2003-283670

(51) Int. Cl.
*G06F 19/00* (2006.01)
*G06K 13/00* (2006.01)

(52) U.S. Cl. ...................................... 235/379; 235/475

(58) Field of Classification Search ................ 235/379, 235/475; 902/8–12
See application file for complete search history.

(56) References Cited

U.S. PATENT DOCUMENTS

| | | | | |
|---|---|---|---|---|
| 4,820,909 | A * | 4/1989 | Kawauchi et al. | 235/379 |
| 5,499,809 | A | 3/1996 | Takemoto et al. | |
| 5,680,935 | A * | 10/1997 | Mistander et al. | 209/534 |
| 5,890,709 | A * | 4/1999 | Phillips | 271/35 |
| 6,367,691 | B1 * | 4/2002 | Graef et al. | 235/379 |

FOREIGN PATENT DOCUMENTS

| | | | |
|---|---|---|---|
| DE | 10010971 | A1 | 9/2001 |
| JP | 08091639 | A * | 4/1996 |
| JP | 2001-302024 | | 10/2001 |
| JP | 2002-163702 | | 6/2002 |
| JP | 2002-216209 | | 8/2002 |
| JP | 2003-091763 | | 3/2003 |
| WO | 03/027969 | A1 | 4/2003 |

* cited by examiner

*Primary Examiner*—Ahshik Kim
*Assistant Examiner*—April A. Taylor
(74) *Attorney, Agent, or Firm*—Fish & Richardson P.C.

(57) ABSTRACT

A banknote processing device where banknotes are stopped at a predetermined position of a stacker guide without being deformed. Braking means (4) is provided at a portion of a stacker guide (3), and the braking means (4) has a rolling body (7) producing a braking force in the advance direction of an inserted banknote without folding the banknote.

5 Claims, 6 Drawing Sheets

BANKNOTE-PROCESSING DEVICE

TECHNICAL FIELD

The present invention relates to a banknote processing device which is disposed in equipment, such as automatic vending machines, game machines, and the like, and which determines whether an inserted banknote is true or false, and stacks true banknotes in a stacker for accommodation, and particularly relates to an improvement of a banknote processing device which is adapted to stack banknotes having different lengths in the same stacker for accommodation.

BACKGROUND ART

In recent years, banknotes, such as the ¥2000 banknote, which have a length different from those of the banknotes already issued have been issued, and in order to cope with such a situation, i.e., in order to meet the need for handling the above-mentioned plurality of types of banknote which have different lengths with a banknote processing device, a variety of banknote processing devices which have been adapted to accommodate those banknotes having different lengths in the same stacker have been proposed.

For such a banknote processing device which accommodates banknotes having different lengths in the same stacker, it is necessary that, in order to avoid a banknote accommodated in the stacker bulging toward the slit side in the stacker guide, thereby colliding with a banknote subsequently transferred, resulting in occurrence of a paper jam, the trailing edge of a banknote transferred along the slit in the stacker guide be stopped at a predetermined position where it is engaged with the drooping prevention lever.

However, even if it is intended that, after feeding a banknote into the stacker guide, the trailing edge of the banknote is stopped at a predetermined position of the stacker guide, the stopping position of the trailing edge of banknotes having different lengths may vary.

For example, the trailing edge of the banknote having the greatest length among the banknotes handled can be relatively positively stopped at the position where it is engaged with the drooping prevention lever, on the basis of the relationship between the length of the stacker guide and the disposed location of the drooping prevention lever, however, in the case of a banknote having a shorter length, the trailing edge of that banknote may not be stopped at a predetermined position of the stacker guide, i.e., may pass the lower end of the drooping prevention lever, being stopped at a position where it is not engaged with the drooping prevention lever, which may result in occurrence of the above-mentioned paper jam.

Then, conventionally, as disclosed in Japanese Patent Application Laid-Open No. 2002-163702, Japanese Patent Application Laid-Open No. 2002-216209, and Laid-Open No. 2003-91763, has been taken a measure of disposing braking means comprised of a stepped portion for folding the edges of the inserted banknote in the direction of the width in order to increase the friction force to be applied to the transferred banknote in a part of the stacker guide that is at a downstream location in the stacker guide, or a part of a pressure plate for transferring the banknote from the stacker guide to the inside of the stacker, and causing this braking means to exert a braking force to the advance of the banknote transferred into the stacker guide in order to positively stop a banknote with a shorter length as well at the position where it is engaged with the drooping prevention lever.

DISCLOSURE OF THE INVENTION

Problems to be Solved by the Invention

However, with the above-mentioned braking means disposed in the conventional banknote processing device, the stepped portion formed in a part of the stacker guide or the pressure plate forcedly folds both edges of the banknote inserted into the stacker guide, thus in folding, damage or deformation is easily caused to the banknote, which may cause banknote jam, i.e., paper jam in the stacker guide with ease.

In view of the above-mentioned situation, the present invention has been made to provide a banknote processing device which can more positively stop a banknote at a predetermined position of the stacker guide without the banknote being deformed.

Means to Solve the Problems

In order to solve the above-mentioned problems, the present invention provides a banknote processing device which is adapted to determine whether an inserted banknote is true or false; guide an inserted banknote regarded as a true banknote into a slit in a stacker guide; and then accommodate it in the same stacker, in which braking means comprised of a rolling body which produces a braking force in an advance direction of the inserted banknote without folding the inserted banknote is disposed in a part of the stacker guide.

Effects of the Invention

With the above-mentioned banknote processing device of the present invention, braking means comprised of a rolling body which produces a braking force in the advance direction of the inserted banknote without folding it is disposed in a part of the stacker guide, thus a banknote processing device which can stop the trailing edge of banknotes with any lengths at a predetermined position of the stacker guide, and which does not fold the banknote, and thus will not cause damage to the banknote, paper jam, and the like, allowing a plurality of types of banknote to be stably accommodated in the same stacker can be provided.

BEST MODE FOR CARRYING OUT THE INVENTION

Hereinbelow, one embodiment of the banknote processing device pertaining to the present invention will be described in detail.

Figure 1:
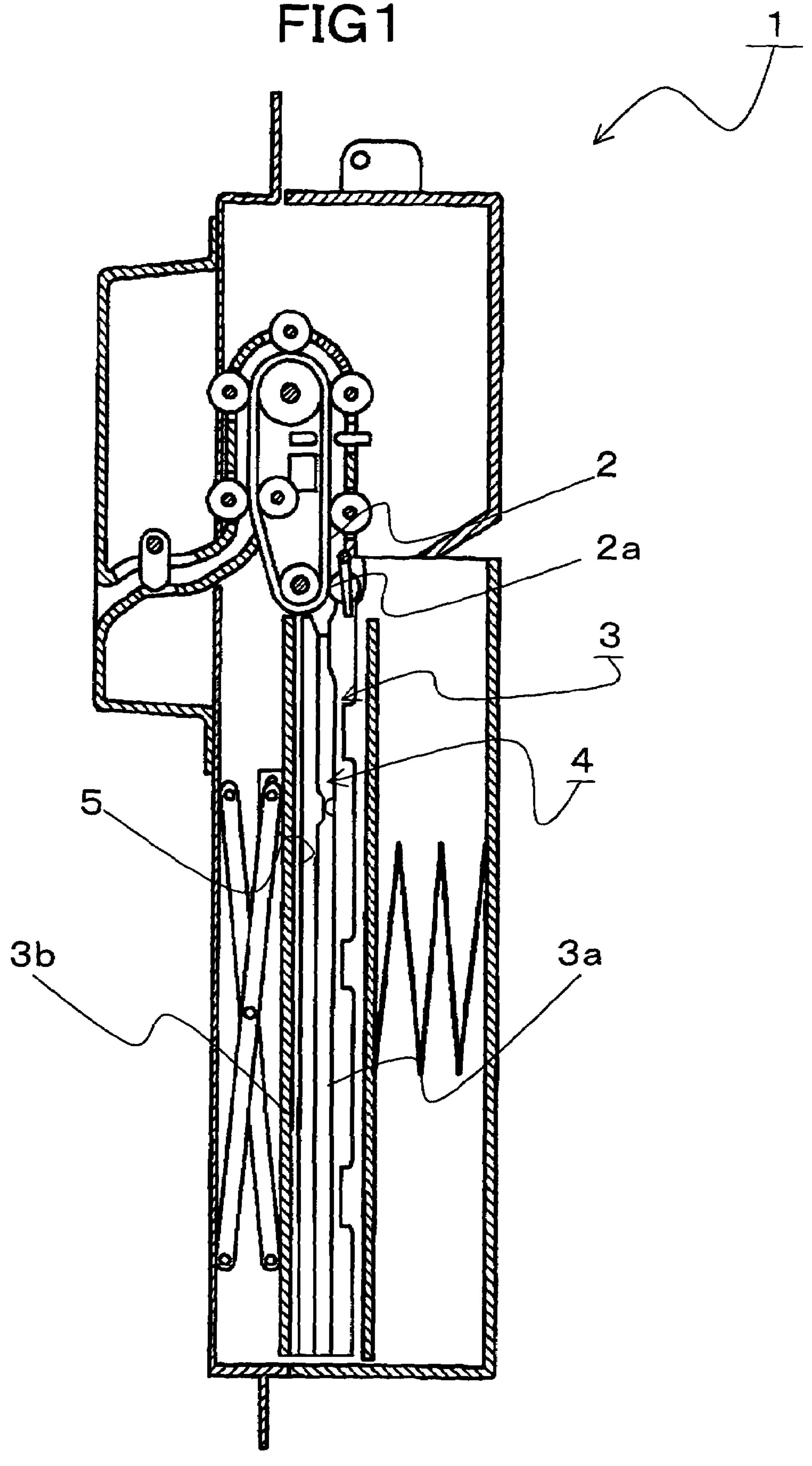
FIG. 1 is a conceptual sectional view illustrating a banknote processing device pertaining to the present invention.

FIG. 1 is a conceptual sectional view illustrating a banknote processing device 1 pertaining to the present invention.

In this banknote processing device 1, braking means 4 which produces a braking force in the advance direction of a transferred banknote is disposed in an upstream part of a stacker guide 3 which guides an inserted banknote downward, such that the trailing edge of a banknote having a particularly short length is stopped at the position where it is not beyond the tip 2*a* of a banknote drooping prevention lever 2. The above-mentioned stacker guide 3 is disposed as a pair with a definite spacing being provided along the direction of the width of the transferred banknote in order to guide both edges in the direction of the width of the inserted banknote, respectively, as known well, and further this stacker guide 3 is composed of a pair of guide members 3*a*, 3*b* in order to provide a slit 5 having a prescribed spacing for guiding banknotes one by one.

Figure 2:
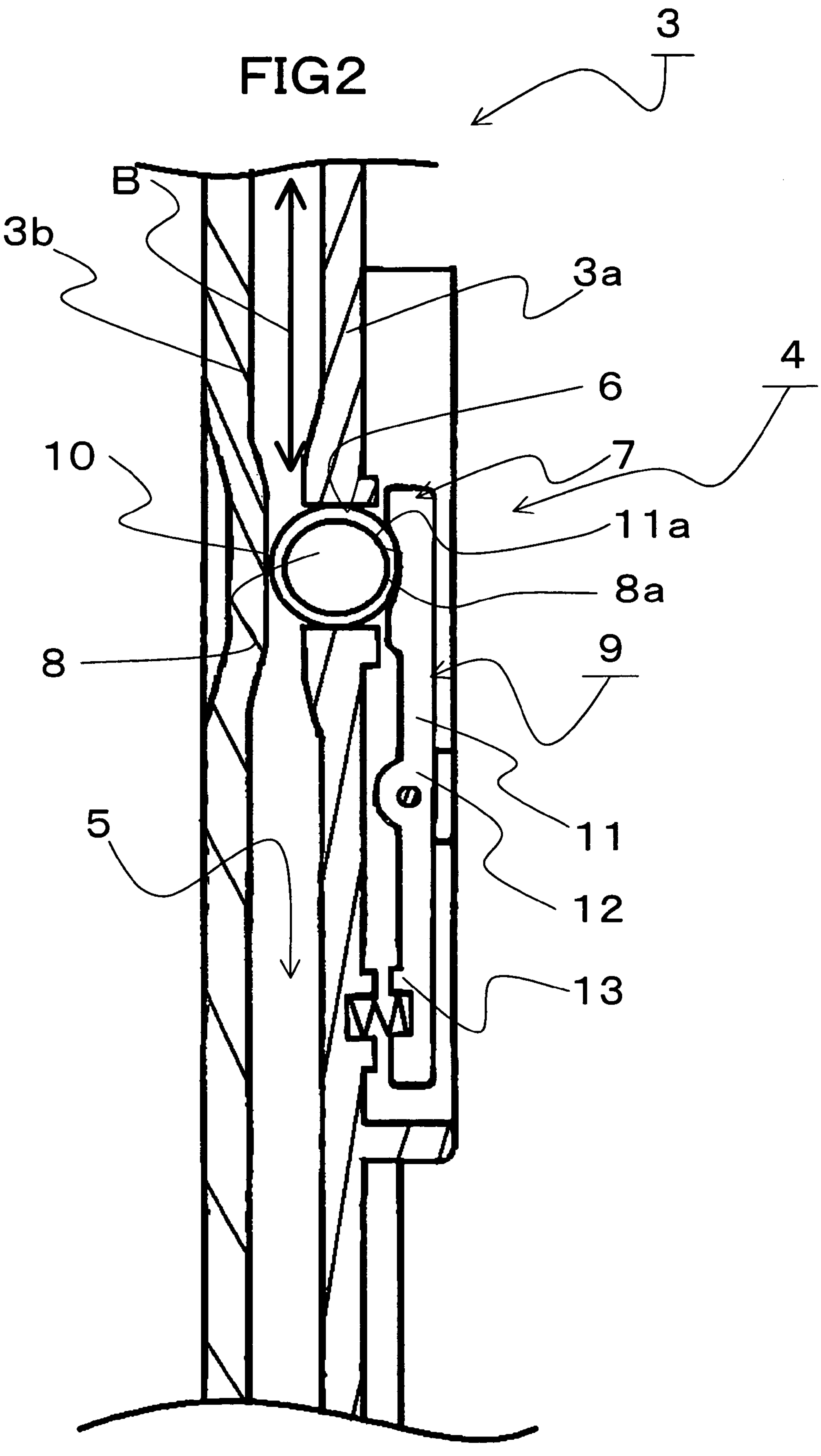
FIG. 2 is a critical portion enlarged sectional view illustrating braking means.

As shown in FIG. 2 given as a critical portion enlarged sectional view of the stacker guide 3, the above-mentioned braking means 4 is composed of a rolling body 7 disposed in a hole 6 having a rectangular section that is formed in one guide member 3*a*.

This rolling body 7 is composed of a cylindrical roller 8 which is rotated along the advance direction (arrow B) of the banknote, and this roller 8 is butted against a convex part 10 protruded from the other guide 3*b* by energizing means 9. The above-mentioned roller 8 is made of steel or synthetic resin, such as plastic, or the like.

On the other hand, the above-mentioned energizing means 9 is composed of a brake lever 11 which is butted against the circumferential surface of the roller 8; a shaft 12 which pivots this lever 11 freely rotatably; and a coil spring 13 which is an energizing member for butting the butting surface 11*a* of the brake lever 11 against the circumferential surface 8*a* of the roller 8 around this shaft 12.

Therefore, to the circumferential surface 8*a* of the roller in the above-mentioned braking means 4, the frictional force by the brake lever 11 is always applied.

Next, the function of the above-described banknote processing device 1 will be explained, with the configuration being more specifically explained.

Figure 3:
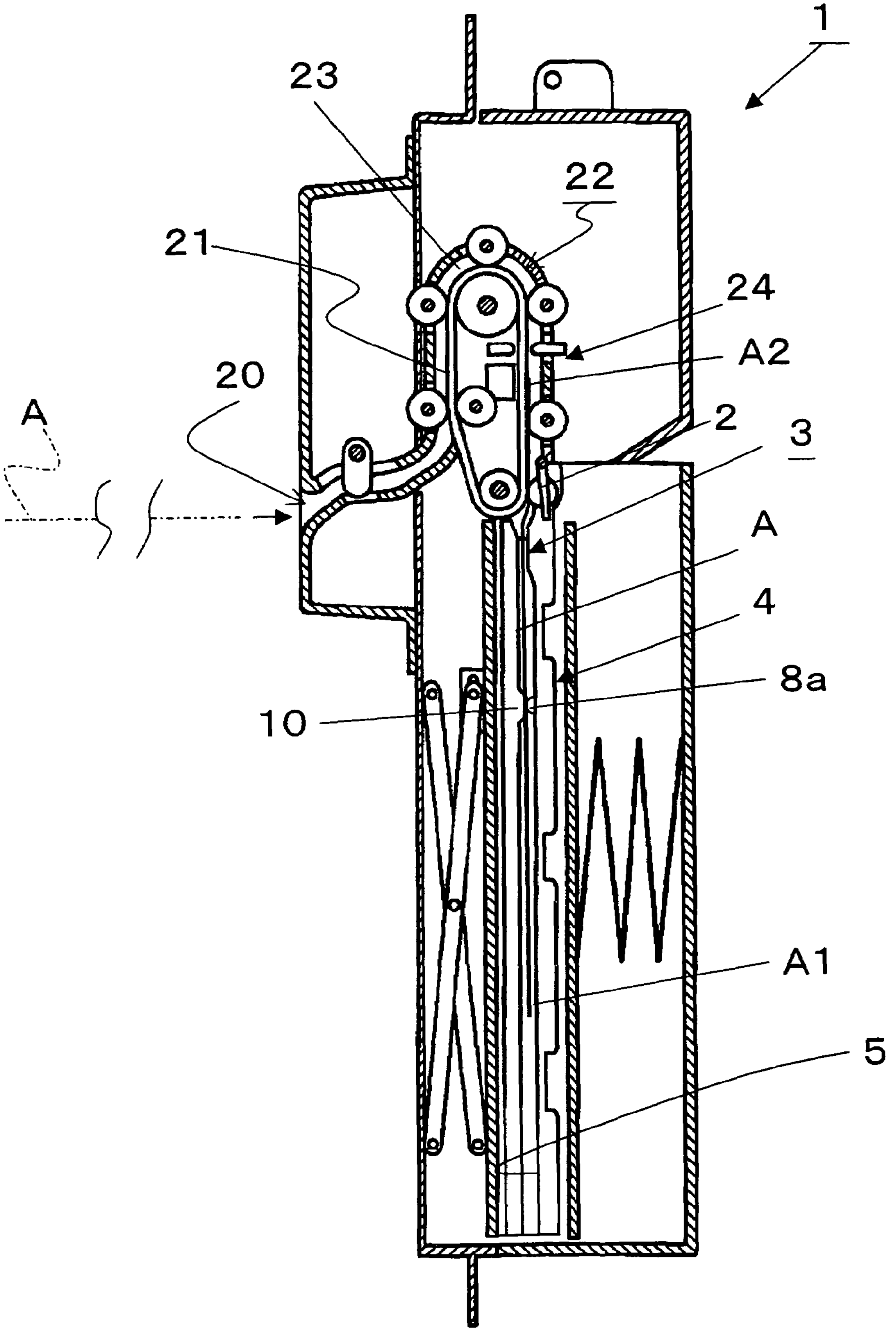
FIG. 3 is a sectional view illustrating the function of the banknote processing device pertaining to the present invention.

As shown in FIG. 3, when a banknote An inserted through a banknote inserting opening 20 is transferred along a substantially inverted-U shaped banknote transfer path 23 to the downstream side thereof by banknote transfer means 22 comprised of a banknote transfer belt 21, a motor (not shown) for driving it, and the like, whether it is true or false is determined by banknote identification means 24 disposed on the way.

This banknote identification means 24 is composed of a magnetic or optical sensor, and the like, as known well.

And when the inserted banknote is determined to be a false banknote by this banknote identification means 24, the banknote transfer means 22 is reversed to return the inserted banknote A from the banknote inserting opening 20.

On the other hand, when the inserted banknote is determined to be a true banknote by the above-mentioned banknote identification means 24, the banknote transfer means 22 is halted, the inserted banknote A being brought into the so-called escrowed state, i.e., the state in which it is halted in a downstream part of the banknote transfer path 23, as shown in the figure. In this escrowed state, the tip side A1 of the banknote A has already been inserted between the convex part 10 in the braking means 4 and the circumferential surface 8*a* of the roller by the banknote transferring force of the banknote transfer means 24, being held between the convex part 10 and the circumferential surface 8*a* of the roller.

And, when the commodity purchase information is inputted, the banknote transfer means 24 is again forward driven to transfer the inserted banknote A in the escrowed state to the downstream side along the slit 5 in the stacker guide 3.

Thus, when the banknote A is again transferred toward the downstream side of the slit 5 in the stacker guide 3 by the banknote transfer means 24 which is again forward driven, a load is generated in the rotational direction of the roller 8 (herein, in the direction toward the downstream side of the slit 5, i.e., the direction of transferring the banknote A) by the brake lever 11 in the braking means 4 as shown in FIG. 2, because both edges of the banknote A along the direction of the width thereof have been already held between the circumferential surface 8*a* of the roller in the braking means 4 and the convex part 10, whereby a definite braking force is applied to the transfer of the banknote A, resulting in the traveling distance thereof being considerably reduced.

Figure 4:
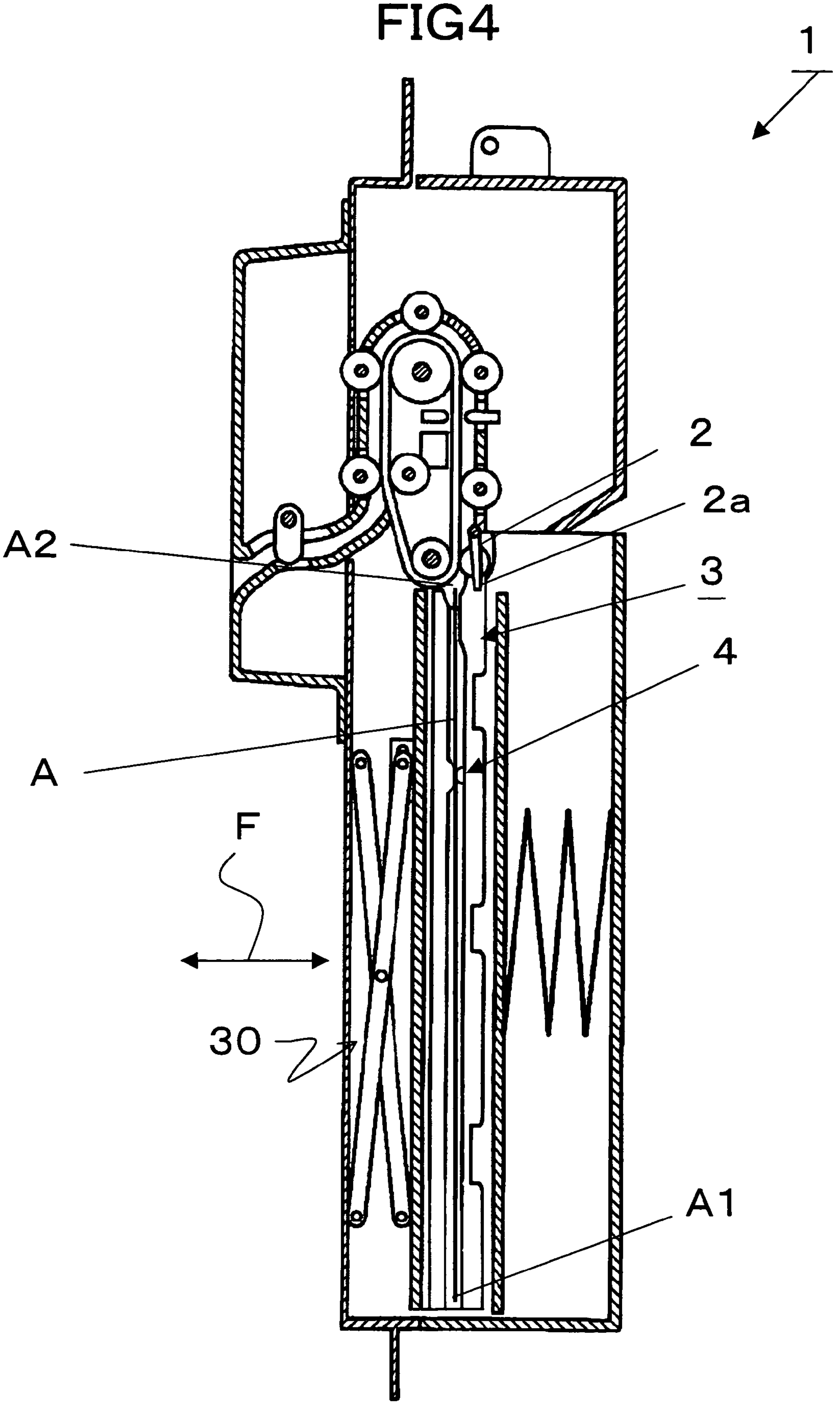
FIG. 4 is a sectional view illustrating the function of the banknote processing device pertaining to the present invention.

Thus, to the escrowed banknote A, the banknote transferring force by the banknote transfer means 24 which is again forward driven is applied, with the braking force being also applied to the transfer thereof, thus, by previously adjusting the banknote transferring force of the banknote transfer means 24 which is again forward driven after the banknote having been escrowed, and the braking force (for example, the spring constant for the coil spring 13) of the roller 8 constituting the braking means 4, the trailing edge A2 of the banknote A which is further transferred to the downstream side of the slit 5 in the stacker guide 3 can be stopped at the position where it is not beyond the tip 2*a* of the banknote drooping prevention lever 2 as shown in FIG. 4, and thereby any of the trailing edges of the banknotes which have different lengths can be stopped at the position where it is not beyond the tip 2*a* of the prevention lever 2.

Figure 5:
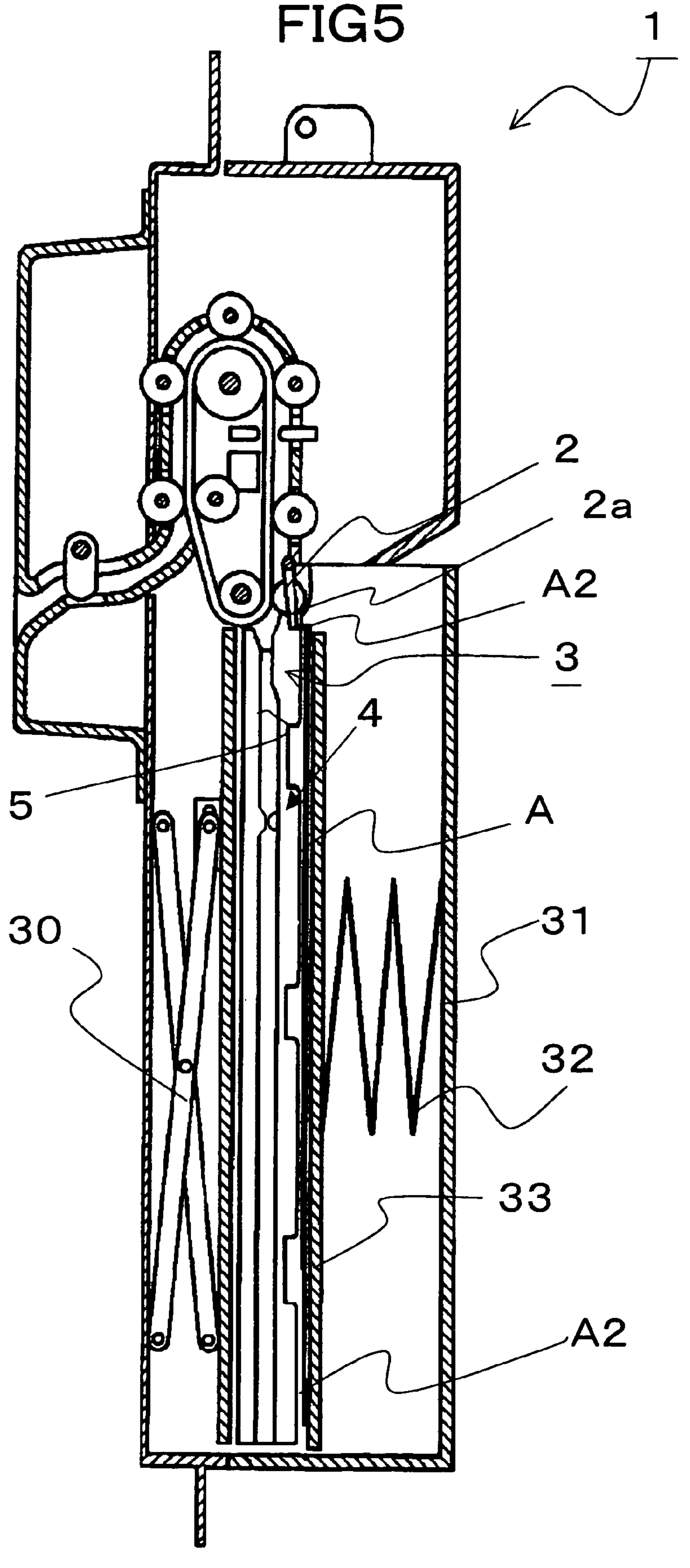
FIG. 5 is a sectional view illustrating the function of the banknote processing device pertaining to the present invention.

Thus, when, after the trailing edge A2 of the banknote A having been stopped at the position where it is not beyond the tip 2*a* of the banknote drooping prevention lever 2, a well-known lift table 30 comprised of a link mechanism is reciprocated one time in the right and left direction in the drawing as shown with an arrows F, the banknote A accommodated in the slit 5 in the stacker guide 3 is moved into a stacker 31 as shown in FIG. 5.

The banknote A which has been moved into this stacker 31 is energized toward the stacker guide 3 side by a pressure plate 33 always energized toward the left side direction in the drawing by pressing means comprised of a coil spring 32.

At that time, the trailing edge A2 of the banknote A is at the location where it is engaged with the tip 2*a* of the banknote drooping prevention lever 2, thus even if the trailing edge A2 of the banknote A bulges for such a cause as bulging of the other banknotes accommodated in the stacker 31, or the like, to move toward the slit 5 side in the stacker guide 3, the movement thereof will be blocked by the engaging banknote drooping prevention lever 2, and not reach the inside of the slit 5, thus, the banknote which is subsequently guided into the slit 5 in the stacker guide 3 will not interfere with the trailing edge A2 of the banknote A accommodated in the stacker 31, which results in the banknote to be subsequently accommodated being smoothly moved into the stacker 31 to be stacked therein for accommodation.

Figure 6:
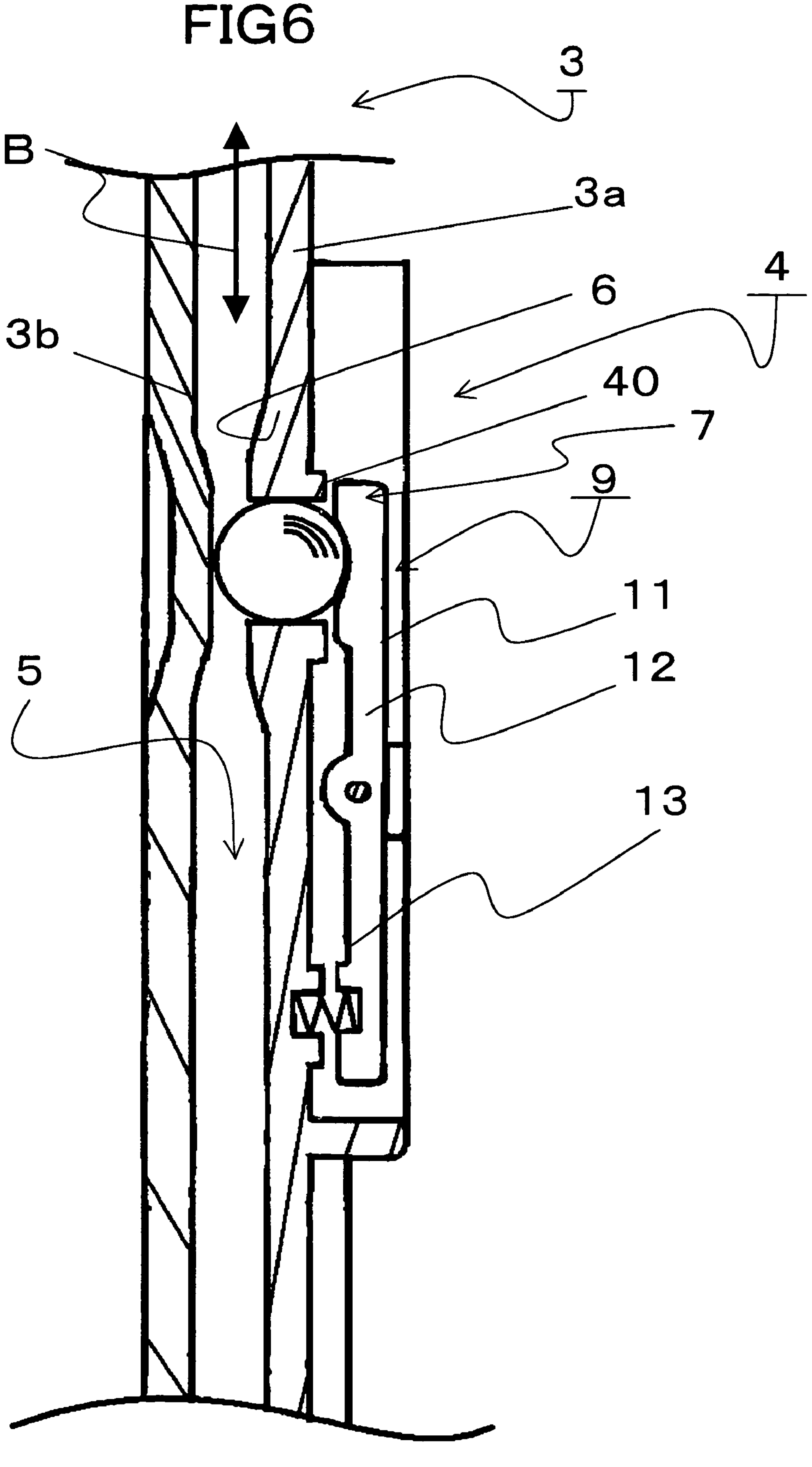
FIG. 6 is a critical portion enlarged sectional view illustrating another embodiment of the braking means.

In the above-described embodiment, the rolling body 7 in the braking means 4 is adapted to be configured of the cylindrical roller 8 which is rotated along only the advance direction of the banknote (the direction of the arrow B) as shown in FIG. 2, however, the present invention is not limited to the above-described embodiment, and as shown in FIG. 6, in which the same portions as those in FIG. 2 are indicated with the same signs, the rolling body 7 may be configured of a spherical body 40 which is freely rotatable in any direction in the hole 6 having a rectangular section. This spherical body 40 can be made of steel or synthetic resin, such as plastic, or the like.

In the above-described embodiment, the application where the respective trailing edges of a plurality of types of banknote which are different in length are positioned to be stopped at a predetermined position has been described, however, for example, even banknotes of the same type may be contracted or extended during the service, resulting in the length being varied, and in such a case, with the above-described banknote processing device 1 pertaining to the present invention, the respective trailing edges of banknotes of the same type having different lengths can, of course, be positioned to be stopped at a predetermined position of the stacker guide.

INDUSTRIAL APPLICABILITY

As explained hereinabove, the present invention is adaptable to a banknote processing device which will not cause banknote jam, and yet can position and stop the trailing edges of various banknotes at a predetermined position as much as possible.

EXPLANATION OF REFERENCE NUMERALS

1 . . . Banknote processing device
3 . . . Stacker guide
4 . . . Braking means
5 . . . Slit
7 . . . Rolling body
8 . . . Roller
11 . . . Brake lever
12 . . . Shaft
13 . . . Energizing member (coil spring)
31 . . . Stacker
40 . . . Spherical body
A . . . Banknote

The invention claimed is:

1. A banknote processing device operable to determine whether an inserted banknote is true or false, and to guide an inserted banknote regarded as a true banknote into a slit in a stacker guide for subsequent accommodation in the same stacker, wherein braking means are provided in a part of the stacker guide adjacent the stacker, the braking means comprising a rolling body having a portion which protrudes from said part of the stacker guide and which is operable to produce a braking force to counter movement in an advance direction of a banknote inserted in said slit without folding the inserted banknote, the braking means being surrounded by said part of the stacker guide except for said protruding portion of the rolling body.

2. The banknote processing device of claim 1, wherein the rolling body is a cylindrical roller which is freely rotatable only along the advance direction of the banknote.

3. The banknote processing device of claim 1, wherein the rolling body is a spherical body which is freely rotatable in any direction.

4. The banknote processing device of claim 1, wherein the braking means comprises a brake lever which is butted against a circumferential surface of the rolling body, and an energizing member which energizes the brake lever in one direction about a lever shaft.

5. The banknote processing device of claim 4, wherein the energizing member is a coil spring.

* * * * *